Dec. 15, 1959   G. V. PLANER ET AL   2,916,920
MOTION TRANSMITTERS
Filed Feb. 14, 1958
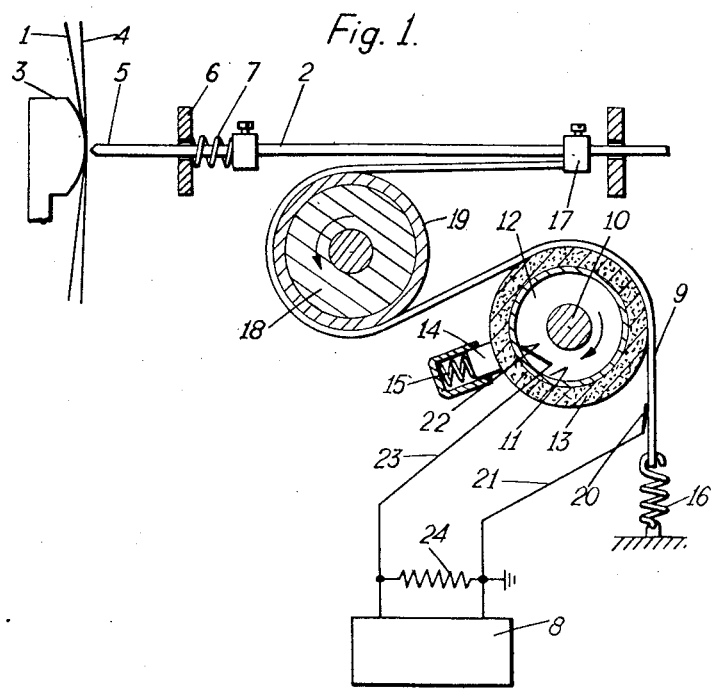
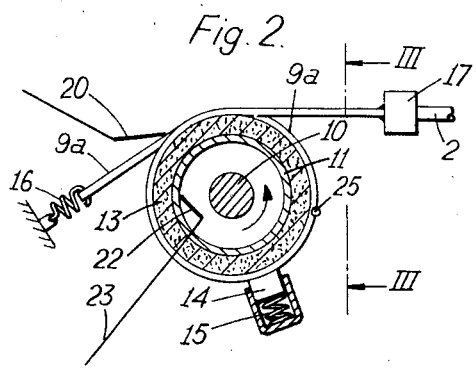
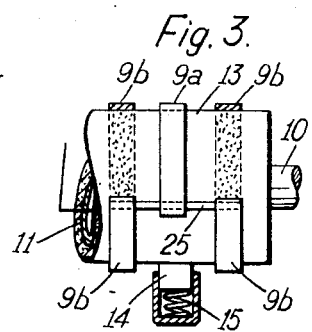
Inventors
GEORGE V. PLANER & ROBERT W. WINDEBANK
By United States Patent Office 2,916,920
Patented Dec. 15, 1959

2,916,920

MOTION TRANSMITTERS

George Victor Planer, Richmond, and Robert William Windebank, Hanworth, Middlesex, England, assignors to Powers-Samas Accounting Machines Limited, London, England, a British company Application February 14, 1958, Serial No. 715,416

Claims priority, application Great Britain March 11, 1957

9 Claims. (Cl. 74—37)

This invention relates to motion transmitters and in particular to a transmitter which is adapted to transmit reciprocatory movement from a continuously rotatable driving member.

Basically the invention is concerned with a motion transmitter in which an electrically conductive band looped round a continuously rotatable driving member is movable lengthwise by the driving member due to electrostatic attraction between the band and an intermediate element engaged thereby and carried by the driving member for rotation therewith. Such a transmitter utilizes the well-known Johnsen-Rahbek effect the theoretical and practical considerations of which are carefully considered in a paper by Miss Audrey D. Stuckes under the title "Some theoretical and practical considerations of the Johnsen-Rahbek effect," Proceedings I.E.E., vol. 103, part B, No. 8, March 1956, pages 125 to 131.

As the result of the tests described in the said paper the conclusion reached was that, owing to the existence of problems, particularly wear and heat generation, to which no adequate solution could be foreseen, an electrostatic motion transmitter involving a continuously rotatable driving member was not a practical proposition. The present invention deals with the problems of wear and heat generation and so minimises them that there is provided a commercially practicable electro-static motion transmitter capable of being used to convert rotary motion into reciprocating motion.

In the investigations mentioned above use was made of a semi-conductor but in carrying the present invention into effect use may be made of an intermediate element which may be a semi-conductor or which may be a dielectric.

According to the present invention there is provided a motion transmitter in which an electrically conductive band looped round a continuously rotatable driving member is movable lengthwise by the driving member due to electro-static attraction between the band and an intermediate member engaged thereby and carried by the driving member for rotation therewith, characterised in that the electro-static attraction effect is developed on a low friction track rotatable relative to the band and produces in the band a force which is tangentially applied to a high friction track also rotatable relative to the band whereby the load applied to the band during operation of an element to which movement is imparted thereby is accommodated by the high friction track.

In order that the invention may be clearly understood two embodiments thereof will now be described, by way of example, with reference to the accompanying diagrammatic drawings in which:

Fig. 1 is an end elevation, partly in section, of a motion transmitter whereby a continuously rotatable driving member is arranged to effect reciprocation of a stylus, Fig. 2 is an end elevation, partly in section, of an alternative embodiment of the invention, and Fig. 3 is a view on line III—III, Fig. 2.

Like reference numerals indicate like or similar parts throughout the figures of the drawings.

Referring to the drawing, the definition of characters on impression-receiving material 1 is effected by dots formed by styluses 2 during lateral reciprocation and lengthwise movement thereof as described in United States patent specification No. 2,674,652. During an imprinting operation the impression-receiving material is located between a platen 3 and a carbon ribbon 4 or other similar transfer media.

Imprinting is effected by a plurality of styluses, only one of which is shown in the drawing, each stylus being arranged to effect the definition of a character independently of the others. The styluses consist of wire-like elements arranged in side-by-side relation and the marking ends 5 thereof are engaged by a bar 6 which is arranged to reciprocate the marking ends of the styluses in a straight-line path at right-angles to the direction of movement of the impression-receiving material over the platen. Reciprocation of the bar 6 is effected in any suitable manner, and the amplitude of reciprocation determines one maximum dimension of the characters formed. The other maximum dimension of the characters to be formed is determined by the rate of movement of the impression-receiving material during character definition. Each stylus is urged to the inactive position thereof by a spring 7 and imprinting is effected, in known manner, by axial or lengthwise movement of the stylus against the action of its spring 7.

The axial movement of the stylus is controlled by electrical pulses transmitted from an electrical pulse generator 8 which may be of any suitable form adapted to produce electrical pulses according to the characters to be defined and the outputs from the generator are controlled by a decoding device, not shown, connected with a record sensing device and an accumulator also not shown.

Axial movements are transmitted to the stylus by an electrically conductive band 9, for example a band of stainless steel, a first part of which is looped round a continuously rotatable driving member which includes a shaft 10 rotatable by an electric motor, not shown. An electrically conductive liner 11, for example a silver liner, is connected to the shaft 10, as by flanged bosses 12 at opposite ends of the liner, to be rotatable with the shaft and in effect to form part of the driving member. Between the band 9 and the liner 11 there extends an intermediate element 13 which is engaged by the said first band part. The intermediate element 13 may be made of a dielectric material or of a material which is a semiconductor. An example of a suitable dielectric material is barium titanate, or barium titanate which includes a small percentage of strontium titanate, such dielectric material being hereinafter and in the appended claims referred to as "barium titanate." An example of a suitable material which is a semi-conductor is chemically treated magnesium orthotitanate.

The intermediate element 13 is carried by the driving member 10, 11 to be rotatable therewith and conveniently consists of a cylinder the outer periphery of which is polished to be as smooth as possible, and the liner 11 is caused by a suitable adhesive to adhere to the interior of the cylinder. If the pulses from the generator are applied to the shaft 10 the end faces of the cylinder are silvered in continuation of the liner so that the pulses are transmitted to the liner by way of the shaft and bosses 12.

The surface resistivity of the peripheral portion of the cylinder 13 which is engaged by the band 9 is retained by effecting lubrication thereof by a material selected as suitable to achieve this result. As shown in the drawings, lubrication is effected by a pad 14 of polytetrafluoroethylene which is urged by a spring 15 to be in continuous engagement with the peripheral surface of the cylinder.

One end of the band 9 is anchored to a light control spring 16 and the other end is connected to an insulating element 17 connected to the stylus 2. A second part of the band 9 is looped round a rotatable roller 18 provided with a lining of high friction material 19 of the kind commonly used to line friction brakes and clutches and the lined roller 18 forms an auxiliary driving member providing a high friction track engaged by the said second part of band 9. The surface of the cylinder 13 is highly polished and so provides a low friction track engaged by the first part of band 9. As can be seen from Fig. 1, the band 9 extends between the cylinder 13 and auxiliary driving member 18, 19, in a manner such that when the first band part is electro-statically locked relative to shaft 10 there is produced in the first band part a force which is applied tangentially to the high friction material 19 so that the second band part is gripped thereby and rotation of roller 18 imparts to the second band part which is connected to the stylus the force necessary to effect the desired movement thereof against the action of spring 7. By this means the load applied to the band 9 during operation of the stylus 2 is accommodated by the high friction track formed liner 19 thus reducing wear and heating of cylinder 13 and so tending further to preserve the surface resistivity of the cylinder.

The first band part is electrically connected with the pulse generator 8 by a brush 20 and lead 21, and the liner 11 is connected to the generator by a brush 22 and lead 23.

The shaft 10 and roller 18 are preferably rotated by driving means, not shown, common thereto and each may be rotated with an angular velocity which may, for example, be of the order of 4,000 r.p.m. This velocity may, however, be lower, for example it may be of the order of 150 to 500 r.p.m.

The circuit is energized by a voltage pulse generated by the generator 8 and the voltage pulse is developed across the output impedance of the generator, which may be a resistor 24. The electro-static force applied between the first band part and the portion of the cylinder 13 engaged thereby causes locking of the band to the cylinder so that the band is caused to move lengthwise therewith and effect lengthwise movement of the stylus 2, as described above, so that the marking end of the stylus causes a dot to be marked on the impression-receiving material 1. On de-energisation of the circuit the output impedance 24 acts as a discharge shunt.

In embodiments of the invention which have been operated in practice, the cylinder has a thickness of 0.125 inch. The outside diameter of the cylinder is 1 inch, and the cylinder is rotated at between 150 and 500 r.p.m. The apparatus is operated by pulses havig a positive peak value in the range of 50 v. to 200 v., and the current flowing during activation of the device is of the order of 500 micro-amperes. If the cylinder is made of barium titanate, as described above, it has a dielectric constant of 1,200 but this may be increased to 3,000 to 5,000 by the use of suitable additives such as strontium titanate, as mentioned above.

Referring to Fig. 2, the movement of shaft 10 is transmitted to a stylus 2 by a first band part 9a, and a second band part 9b connected by a connecting member 25. In this embodiment of the invention, cylinder 13 is polished only where it is engaged by a first band part 9a and is left in a rough condition where it is engaged by a second band part 9b. Thus the surface of the cylinder presents alternate low-friction tracks and high friction tracks which are rotatable about an axis common thereto and the tracks are arranged to extend round the cylinder to be parallel one to the other. The ends of second band parts 9b remote from the connector member 25 are suitably connected to an insulating member similar to member 17 so that when the first band part 9a is locked relative to shaft 10 a tangential force is applied thereby through connector 25 to the second band parts 9b, and band parts 9b by co-operation with the high friction tracks effect operation of the stylus 2.

It will be understood that, if desired, instead of the high friction tracks being provided by unpolished areas of the cylinder, the low friction and high friction tracks may be provided by a composite roller consisting of alternate high polished cylinders and cylinders provided with outer linings of brake or clutch lining material.

Although in the foregoing description the invention has been described as transmitting motion to a reciprocable stylus it will be understood that a motion transmitter as described herein can be used for a number of purposes and that, in particular, having regard to the art of record controlled statistical machines, such a transmitter can be adapted to effect the setting of set bars of a punch unit, or to effect the operation of the punches of a punch unit.

We claim:

1. A motion transmitter in which an electrically conductive band looped round a continuously rotatable driving member is movable lengthwise by the driving member due to electro-static attraction between the band and an intermediate material engaged thereby and carried by the driving member for rotation therewith, characterised in that the electro-static attraction effect is developed on a low friction track rotatable relative to the band and produces in the band a force which is tangentially applied to a high friction track also rotatable relative to the band whereby the load applied to the band during operation of an element to which movement is imparted thereby is accommodated by the high friction track to minimize wear and heating of the low friction track.

2. A motion transmitter according to claim 1, wherein the band co-operates with a low friction track provided on the driving member and the high friction track is provided on an auxiliary driving member rotatable independently of the driving member.

3. A motion transmitter comprising a continuously rotatable driving member, an intermediate dielectric material forming a low friction track rotatable with the driving member, a rotatable high friction track, band means a first part of which is looped round and engages the low friction track and a second part of which is connected with said first part and is looped around to engage the high friction track, and a driven element connected to said second band part and supported for lengthwise reciprocation, said first band part being electrically conductive and adapted when an electrostatic attraction effect is developed on the low friction track to produce a force which is applied tangentially to said second band part whereby during transmission of movement by the second band part to the driven element the driving load is accommodated by the high friction track to minimize wear and heating of the low friction track.

4. A motion transmitter according to claim 3, wherein the low friction track and the high friction track are rotatable about an axis common thereto.

5. A motion transmitter accordling to claim 4, wherein the low friction track and the high friction track are each provided on the driving member and extend therearound to be parallel one to the other.

6. A motion transmitter comprising a continuously rotatable driving member, an electrically conductive band looped round the driving member, an intermediate dielectric material forming a low friction track rotatable with the driving member and engaged by the band, a driven element reciprocable by lenghtwise movement of the band, and a high friction track rotatable relative to the band and engaged by the band in a manner such that when an electro-static attraction effect is developed on the low friction track there is produced in the band a force which is applied tangentially to the high friction track whereby during transmission of movement by the band to the driven element the driving load is accommodated by the high friction track to minimize wear and heating of the low friction track.

7. A motion transmitter according to claim 6, wherein the dielectric material is barium titanate.

8. A motion transmitter comprising a continuously rotatable driving member, an electrically conductive band looped round the driving member, an intermediate semi-conductor forming a low friction track rotatable with the driving member and engaged by the band, a driven element reciprocable by lengthwise movement of the band, and a high friction track rotatable relative to the band and engaged by the band in a manner such that when an electro-static attraction effect is developed on the low friction track there is produced in the band a force which is applied tangentially to the high friction track whereby during transmission of movement by the band to the driven element the driving load is accommodated by the high friction track to minimize wear and heating of the low friction track.

9. A motion transmitter according to claim 8, wherein the semi-conductor comprises chemically treated magnesium orthotitanate.

References Cited in the file of this patent

UNITED STATES PATENTS

| | | |
|---|---|---|
| 1,491,170 | Rottgardt | Apr. 22, 1924 |
| 1,631,764 | Ruben | June 7, 1927 |
| 2,148,482 | Lorenz | Feb. 28, 1939 |
| 2,630,512 | Rahbek | Mar. 3, 1953 |
| 2,850,907 | Foster | Sept. 9, 1958 |
| 2,850,908 | Foster | Sept. 9, 1958 |

FOREIGN PATENTS

| | | |
|---|---|---|
| 533,368 | France | Dec. 8, 1921 |